(12) United States Patent
Schneider et al.

(10) Patent No.: US 11,067,476 B2
(45) Date of Patent: Jul. 20, 2021

(54) APPARATUS AND METHOD FOR MEASURING AT LEAST ONE OPTICALLY EFFECTIVE OBJECT

(71) Applicant: SCHNEIDER GmbH & Co. KG, Fronhausen (DE)

(72) Inventors: Gunter Schneider, Marburg (DE); Stephan Huttenhuis, Weimar-Niederweimar (DE); Sebastian Schneider, Marburg (DE)

(73) Assignee: SCHNEIDER GmbH & Co. KG, Fronhausen (DE)

(*) Notice: Subject to any disclaimer, the term of this patent is extended or adjusted under 35 U.S.C. 154(b) by 88 days.

(21) Appl. No.: 16/280,771

(22) Filed: Feb. 20, 2019

(65) Prior Publication Data
US 2019/0257714 A1    Aug. 22, 2019

(30) Foreign Application Priority Data

Feb. 21, 2018  (DE) ..................... 10 2018 001 385.6
Sep. 21, 2018  (DE) ..................... 10 2018 007 463.4

(51) Int. Cl.
*G01B 11/25* (2006.01)
*G01M 11/02* (2006.01)

(52) U.S. Cl.
CPC ..... *G01M 11/0235* (2013.01); *G01B 11/2513* (2013.01); *G01M 11/025* (2013.01);
(Continued)

(58) Field of Classification Search
CPC ......... G01M 11/0235; G01M 11/0207; G01M 11/025; G01M 11/0257; G01M 11/0285;
(Continued)

(56) References Cited

U.S. PATENT DOCUMENTS 5,454,194 A    10/1995  Gottschald
5,945,685 A *   8/1999  Imaino ................... G01N 21/94
                                                    250/225
(Continued)

FOREIGN PATENT DOCUMENTS

DE        102005057725 A1    6/2007
EP              1093907 A2    4/2001
WO     WO-2017120161 A1 *   7/2017 ......... G01B 11/0633

*Primary Examiner* — Mark R Gaworecki
(74) *Attorney, Agent, or Firm* — Jason H. Vick; Sheridan Ross, PC

(57) ABSTRACT

A device and method are described having/using at least a first radiation source and a second source of radiation, at least one measurement or detection device as well as at least one evaluation system with the first radiation source and second radiation source either oriented towards a top or bottom side of the optically effective object, or together oriented towards the top or bottom of the optically effective object, whereby at least the first radiation source emits reflective radiation towards the optically effective object and/or excitation radiation emitted for the stimulation of luminescence radiation in the material of the optically effective object and/or in the coating material of the optically effective object, and whereby the second radiation source at least emits radiation that penetrates through the optically effective object.

20 Claims, 5 Drawing Sheets

(52) U.S. Cl.
CPC .... *G01M 11/0207* (2013.01); *G01M 11/0228* (2013.01); *G01M 11/0257* (2013.01); *G01M 11/0285* (2013.01)

(58) Field of Classification Search
CPC .......... G01M 11/0228; G01M 11/0278; G01B 11/2513; G01B 11/255
USPC ..................................................... 250/459.1
See application file for complete search history.

(56) References Cited

U.S. PATENT DOCUMENTS

| | | | |
|---|---|---|---|
| 5,969,370 A * | 10/1999 | Imaino | G01N 21/88 250/559.06 |
| 5,973,772 A | 10/1999 | Fukuma et al. | |
| 5,991,018 A * | 11/1999 | Imaizumi | G01B 11/0616 356/237.1 |
| 6,613,041 B1 | 9/2003 | Schründer | |
| 6,902,468 B2 | 6/2005 | Luderich et al. | |
| 6,909,498 B2 | 6/2005 | Devie et al. | |
| 8,081,840 B2 | 12/2011 | Laurent | |
| 8,836,936 B2 * | 9/2014 | Lin | G01N 21/94 356/239.8 |
| 9,074,874 B2 * | 7/2015 | Blair | G01B 11/0625 |
| 9,726,572 B2 | 8/2017 | Henry et al. | |
| 9,908,714 B2 | 3/2018 | Schneider | |
| 2007/0260422 A1 * | 11/2007 | Marcus | G01B 11/0683 702/172 |
| 2007/0264915 A1 | 11/2007 | Mazoyer | |
| 2008/0144001 A1 * | 6/2008 | Heeg | G01J 3/12 356/32 |
| 2009/0208072 A1 | 8/2009 | Seibel et al. | |
| 2010/0033735 A1 * | 2/2010 | Sakai | G01B 11/303 356/632 |
| 2011/0075887 A1 | 3/2011 | Tanaka | |
| 2012/0008103 A1 * | 1/2012 | Lalley | G09B 23/22 353/69 |
| 2013/0293726 A1 | 11/2013 | Armstrong-Muntner | G01M 11/0278 348/187 |
| 2014/0041184 A1 * | 2/2014 | Schneider | B24B 9/14 29/407.04 |
| 2014/0218725 A1 * | 8/2014 | Lin | G01N 21/94 356/239.8 |
| 2014/0273051 A1 * | 9/2014 | Reddy | G01N 21/78 435/25 |
| 2015/0204778 A1 * | 7/2015 | Kubiak | G01N 21/251 356/402 |
| 2017/0348823 A1 | 12/2017 | Gerrath et al. | |
| 2018/0052075 A1 * | 2/2018 | Seno | G01M 11/0235 |
| 2018/0217309 A1 * | 8/2018 | Dewa | G02B 5/3083 |
| 2018/0299345 A1 * | 10/2018 | Koenig, II | G01N 21/8803 |
| 2019/0011251 A1 * | 1/2019 | Moeller | G01B 21/06 |
| 2019/0226997 A1 * | 7/2019 | Nitikin | G01N 21/8806 |

* cited by examiner

APPARATUS AND METHOD FOR MEASURING AT LEAST ONE OPTICALLY EFFECTIVE OBJECT

CROSS-REFERENCE TO RELATED APPLICATIONS

This application claims priority to German National Application DE 10 2018 001 385.6 filed Feb. 21, 2018 and German National Application DE 10 2018 007 463.4 filed Sep. 21, 2018.

BACKGROUND OF THE INVENTION

The present invention relates to a device for measuring at least one optically effective object, comprising a radiation source, a measuring device, and means for holding at least one optically effective object between the radiation source and the measuring device. The present invention further relates to a method for measuring at least one optically effective object having a top side and a bottom side, and wherein at least one optically effective object is irradiated with a measuring radiation and the resulting radiation is measured.

International patent application WO 2016/095939 A1 describes a method and a device for the edge processing of an optical lens, wherein the device has a measuring instrument for determining the orientation and the contour of the optical lens. The optical lens is in this case arranged between a radiation source and a measuring device. The disadvantage here is that only the data required for the edge processing of the optical lens can be calculated.

International Patent Application WO 2014/019806 discloses a method and an apparatus for determining a geometrical property of a lens for a spectacle lens using the fluorescence effect. Here, a surface of the lens to be measured is irradiated perpendicularly with a strip-shaped excitation radiation, wherein the lens is guided under the excitation radiation. The generated fluorescence radiation is detected by means of a camera positioned at an angle. The evaluation is carried out as a comparison of the detected image with reference values for given lens types (e.g. single vision, bifocal, progressive, etc.). This measuring device and the method that can be carried out with it are limited to the contactless scanning of the lens surface and the rapid determination of the lens type.

The German patent application DE 198 37 932 A1 describes a method and a device for determining the surface shape of the cornea of the human eye using the fluorescence effect, wherein the surface is measured by triangulation. For this purpose, the cornea is irradiated with excitation radiation, wherein at the same time a stripe pattern is projected onto the cornea, and the resulting stripe-shaped fluorescence radiation is detected and calculated. This device and this method are geared to the requirements and basic conditions of a laser surgery on the cornea.

International Patent Application WO 2005/121740 A1 discloses a measuring device for lenses for detecting different types of errors in the lens surface. A programmable LCD screen produces periodically repeating grid patterns. The lens to be measured is recorded with several images under temporally and spatially displaced lattice patterns. The individual images are computationally converted into a combined image which makes surface defects in the lens visible. Also, this measuring device is limited to the detection of special data, namely surface defects in the lens.

There is a need to improve the art to provide a compact device for determining different characteristics, in particular optical properties of the optically effective object. Accordingly, a method is needed such that different parameters of the optically effective object can be determined.

SUMMARY OF THE INVENTION

The device according to the present invention is characterized by the fact that it has at least a first light source and a second source of radiation, that it has at least a measurement or detection device, as well as at least an evaluation system with the first radiation source and second radiation source either oriented towards a top or bottom side of the optically effective object, or together oriented towards the top or bottom of the optically effective object, whereby the first radiation source emits reflective radiation towards the optically effective object and/or excitation radiation emitted for the stimulation of luminescence radiation in the material of the optically effective object and/or in the coating material of the optically effective object, and whereby the second radiation source at least emits radiation that penetrates through the optically effective object.

The method according to the present invention is characterized in that at least one radiation which can be reflected by the optically effective object is used as the measuring radiation, and the reflection radiation is measured and/or detected as resulting radiation, and/or at least one excitation radiation for the excitation of luminescence radiation in the material of the optically active object and/or in the material of a coating of the optically active object is measured and/or detected, wherein the luminescence radiation and/or the reflective radiation and/or a transmission radiation is measured and/or detected.

The device according to the invention and the method according to the invention thus make it possible to measure the optically effective object in a particularly simple and flexible manner, in particular depending on the measurement data desired in the individual case, depending on the properties of the material or materials of the optically effective object to be measured and its processing status.

DETAILED DESCRIPTION OF THE INVENTION

Figure 1:
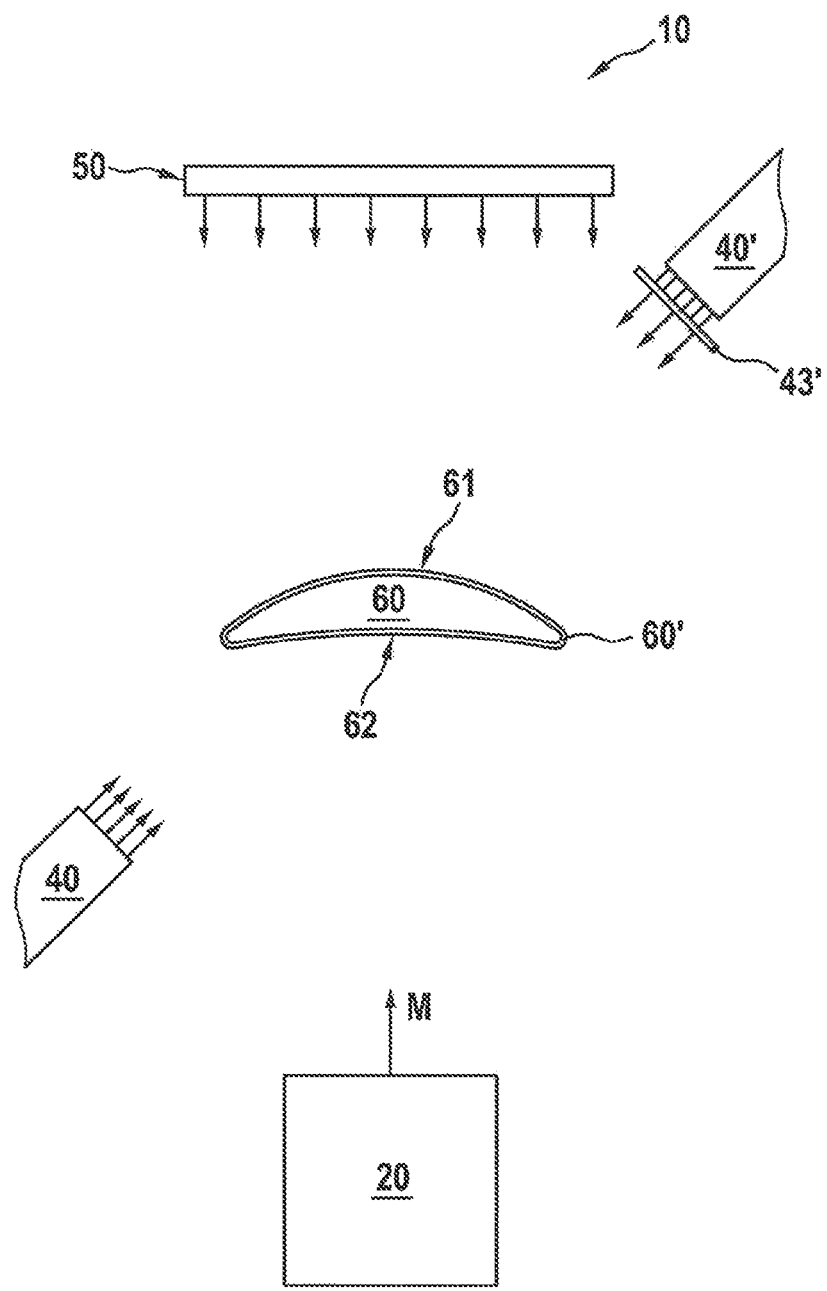
FIG. 1 is a diagrammatic view of an embodiment of the device according to the present invention.

Various embodiments of the invention will now be described in detail with reference to the Figures. These figures are merely provided to assist in the understanding of the invention and are not intended to limit the invention in any way. One skilled in the art will recognize that various modifications and changes can be made to any of these embodiments without departing from the scope and spirit of the present invention.

The device according to the invention as well as the measuring method according to the invention make it possible to measure the optically effective object in any machining stage under the same or comparable boundary conditions, adapted to the requirements of the individual case.

Both the device according to the invention and the method according to the invention can be integrated into an existing processing system for the optically effective object to be measured, both with regard to existing processing devices and with respect to existing processing operations.

The device according to the invention is distinguished by its mechanical construction. In particular, it is not absolutely necessary to provide telecentric devices because the construction of the device according to the invention allows calibration measurements to be carried out.

In addition, the structure of the device according to the invention can be adapted to the requirements of the individual case, resulting, for example, from the material properties of the optically active object to be measured. For example, the wavelength of the excitation radiation for the luminescence radiation can be adjusted, for example, by switchable filters or by exchanging the radiation source for the luminescence properties of the material of the optically active article and/or its coating in the individual case. Particularly preferred hereby is an excitation radiation with a wavelength in the range of about 200 nm (UV radiation) to about 575 nm (radiation in the visible range; green), since the wavelengths of the emitted luminescence radiation are then generally still in the visible wavelength range (up to approximately 750 nm; red) and are therefore particularly easy to measure and/or detect.

Thus, optically effective objects made of materials with different luminescence properties, in particular with excitation radiation of different wavelengths, can be measured by adjusting the wavelength of the excitation radiation by a suitable choice of the respective radiation source. The wavelength of the excitation radiation emitted by the respective radiation source is therefore chosen so that the desired luminescence effect occurs depending on the selected material of the optically effective object. Another advantage is that optionally the material of the optically effective object itself as well as the material of a coating possibly present on the optically effective object for exciting luminescence radiation can be excited.

The design of the device according to the invention also makes it possible that the device can be arranged as such, for example, on a frame, a holder or a work table and can be used in particular for carrying out the method according to the invention. However, the device according to the invention can also be integrated into another device, for example for machining, in particular shaping, of an optically active object.

A further preferred embodiment of the device according to the invention is that one or several lasers are used as at least the first radiation source. The radiation emitted by a laser is generally comparatively energy-rich, resulting in a correspondingly high signal strength detected by the measuring and/or detection device.

The method according to the invention also makes it possible to combine measured data from two or more measuring methods carried out successively or simultaneously by means of the device according to the invention. Thus, for example, the determination of a two-dimensional evaluation of the refractive power of the optically active object (so-called "power map") is possible. In this way, it is, for example, also possible to distinguish prisms from prism errors incorporated in an optically effective object in the form of an optical lens, according to the order. This is true of prism errors that may arise in the shaping of a lens, as well as prism errors that may be detected due to improper positioning of a lens during its measurement.

Finally, the device according to the invention and the method according to the invention make it possible to remove optically effective objects subject to machining or other errors from a processing device or a processing sequence as soon as possible after the occurrence of the error.

Particularly preferable, at least the first radiation source emits at least one excitation radiation for exciting fluorescence radiation in the material of the optically effective object and/or emitted in the material of a coating of the optically effective object. In this way, a longer luminescence of the material or materials is avoided, which could interfere with the following processing method and/or the subsequent machining process.

At least the first radiation source preferably excites punctiform, line-shaped, grid-shaped and/or grid-shaped luminescence radiation. This can be done, for example, by introducing an arbitrarily configured slit diaphragm or mask into the beam path of the excitation radiation emitted by at least the first radiation source, so that the excitation radiation emerging from the slit diaphragm or mask is in the form of a corresponding pattern, strikes the optically effective object to be measured and stimulates luminescence radiation in the form of this pattern. However, it is particularly preferable to provide an arrangement or an array of two or more radiation sources, each emitting, for example, point-shaped or line-shaped excitation beams which strike the optically active object to be measured in such a way that a defined pattern results, for example a dot pattern, line pattern, stripe pattern, grid pattern, check pattern, etc.

In a particularly preferred embodiment of the device according to the invention, at least the second radiation source emits at least one radiation in the form of pixels and/or in the form of patterns. This is particularly advantageous for the measurement and/or detection of parameters of the optically active object, such as its contour, its edge, its diameter, the position of markings incorporated into the object (engraving and the like) or the position of multifocal range bifocal or trifocal glasses.

Expediently, at least one measuring and/or detection device and at least one of the radiation sources are oriented towards the same upper side or lower side of the optically effective object. With this arrangement, for example, at least one radiation source can be used both for the emission of reflectable radiation and for the emission of excitation radiation for exciting a luminescence effect.

A particularly preferred development of the method according to the invention is that the resulting reflection radiation and/or the resulting luminescence radiation is used for triangulation of the surface(s) of the irradiated upper side and/or the irradiated underside of the optically effective object. In particular, triangulation results in numerous measuring points distributed over the irradiated upper side or lower side, which permit a particularly accurate evaluation for determining characteristics of the upper side or underside.

In a particularly advantageous manner, the inventive method allows the use of the resulting transmission radiation and/or the resulting reflection radiation for determining the refractive power of the optically active article and/or characteristics of the optically active article.

The inventive method thus allows the successive or preferably simultaneous determination of various parameters of the optically effective object, in particular the area evaluation of the refractive power of the optically effective object.

The device according to the invention and the method according to the invention can be used in particular for the measurement of ophthalmic lenses and lens blanks in any desired processing stages or at any desired positions of a processing sequence in a processing system. Of course, any other optically effective objects can be measured, for example, optical lenses for microscopes, camera lenses, binoculars or telescopes.

An exemplary embodiment of the present invention will be described in more detail in the following by means of the attached drawings.

Figure 2:
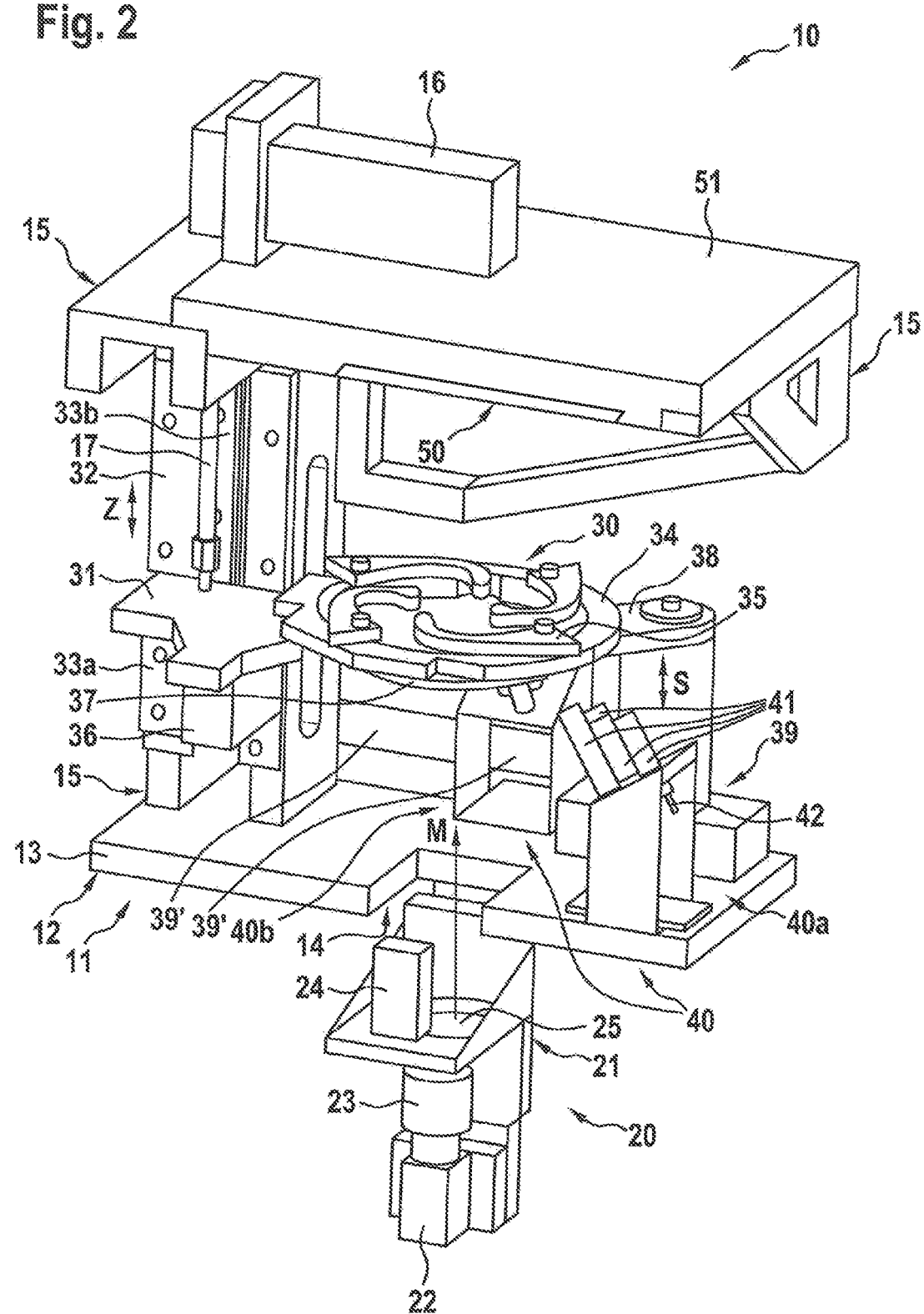
FIG. 2 is a perspective representation of the embodiment of the device according to the invention in a loading position.
Figure 3:
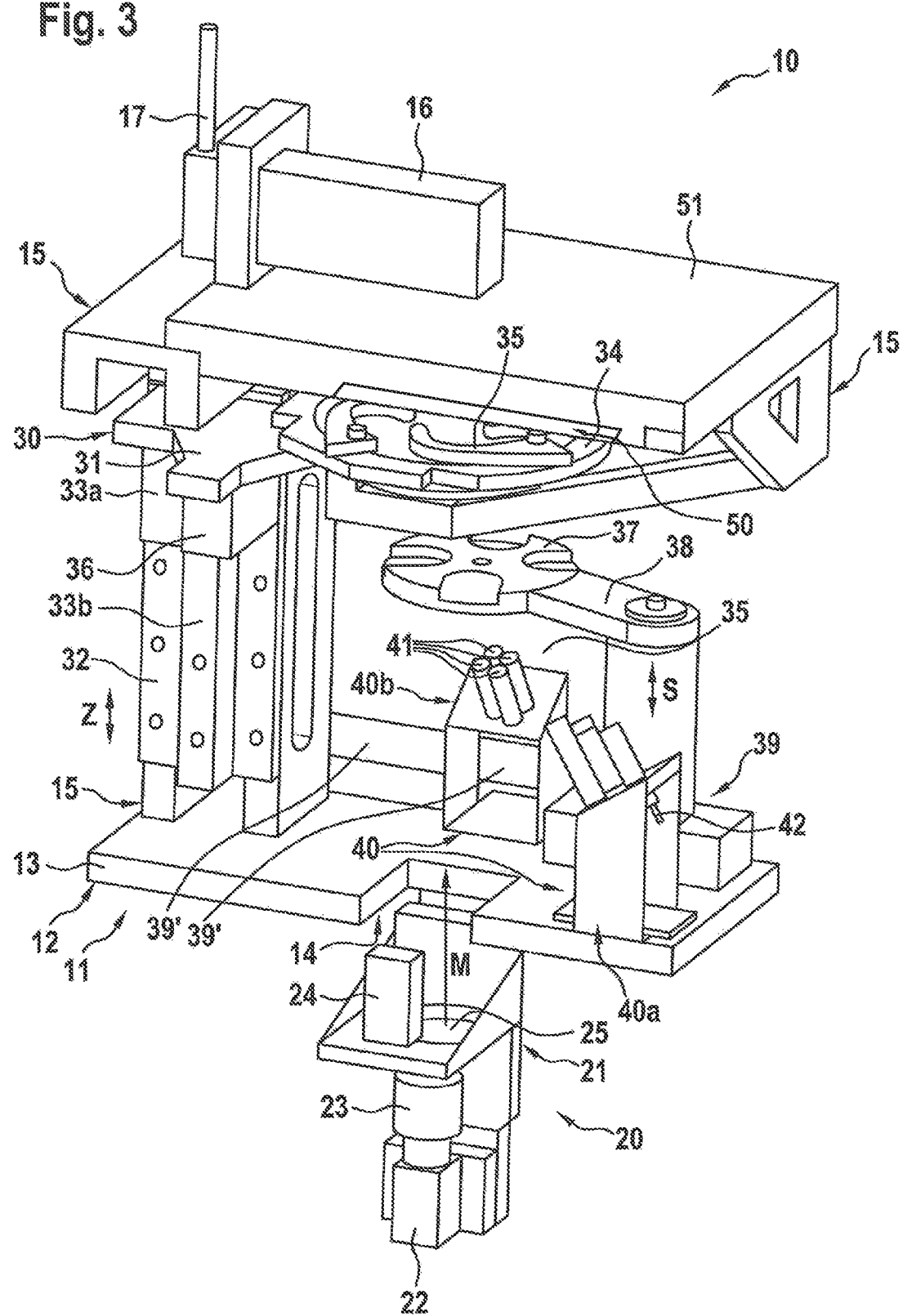
FIG. 3 is a perspective representation of the embodiment of the device according to the invention as per FIG. 2, in a measuring position.

FIGS. 1 to 3 show an embodiment of the device 10 according to the invention. As shown in FIG. 1, the exemplary embodiment is used to measure an optically active object in the form of an optical lens (hereinafter: lens 60) having a convex top side 61 in the exemplary embodiment and a bottom concave side 62 in the exemplary embodiment. The lens 60 may further be provided in a manner known per se with a coating 60', for example an antireflection and/or a hardcoat. According to the invention, the device 10 has at least one first radiation source 40, optionally a further radiation source 40' with an upstream slit diaphragm or mask 43' for generating a radiation pattern, a second radiation source 50 and a measuring and/or detection device 20. As shown in FIG. 2, with reference to FIG. 1, the orientation of a measuring and/or detection unit, for example of the camera lens 23 of a camera 22 of the measuring and/or detection device 20 defines a measuring axis M.

The device 10 can be arranged in a manner known per se on a frame, a holder or a workbench. However, the device can also be integrated, for example, into a device for processing or for the shaping of an optically effective object, like an optical lens, in particular an ophthalmic lens.

As can be seen from FIGS. 2 and 3, an exemplary embodiment of a device 10 according to the invention has a holding table 11 with a lower side 12 and an upper side 13. On the underside 12 of the holding table 11, a camera unit 20 is attached. The camera unit 20 has a holder 21, on which a camera 22 (in the embodiment, a camera with a CCD sensor) is held with a camera lens 23. The camera lens 23 is directed vertically upward. The camera 22 is provided in the embodiment with a polarizing filter (not shown). Therefore, above the camera lens 23 on the holder 21, a motor 24, in the embodiment an electrically operated stepping motor, is arranged for rotation of the polarizing filter. The polarization filter is used in a manner known per se for determining the polarization direction of a polarized lens. Furthermore, the camera 22 or the camera lens 23 has a filter device (not shown) for absorbing and/or deflecting the excitation radiation emitted by the laser diodes 41 (see below). Through an opening 25 in the holder 21 and a recess 14 in the holding table results for the camera lens 23, a free measuring path in the vertical direction, whereby a vertically extending measuring axis M is defined.

On the upper side 13 of the holding table 11, a holding element 15 is arranged. On the holding element 15, a rack gear with a motor having a drive unit 16 is held. The drive unit 16 moves a rack 17 along a movement axis, Z, (hereinafter: z-axis) in a manner known per se. The z-axis, Z, and the measuring axis M in the exemplary embodiment run in the vertical direction parallel to each other.

At the lower end of the rack 17, a holding plate 31 of a gripping unit 30 is affixed. The holding plate 31 is fixed to a guide shoe (33a). The guide shoe 33a is guided on a guide rail 33b preferably free of play, for example biased to rolling, in a manner known. The guide rail 33b is fixed to a guide plate 32, which in turn is held on the holder 15.

On the holding plate 31, a gripping device 34, in the embodiment, a centering/gripping device, fixed with movable gripping elements 35 is shown, as it is known, for example, from WO 2016/095939 A1. The gripping device 34 serves for gripping and centering the lens. With the aid of the rack and pinion gear, the holding plate 31 and thus the gripping device 34 can be moved vertically in the direction of the z-axis along the guide rail, 33b.

The gripping elements 35 are pneumatically movable in the embodiment. Below the holding plate 31, therefore, a pneumatic cylinder drive 36 is provided for moving the gripping elements 35.

Below the gripping device 34, a storage table 37 is arranged, which by means of a holding arm 38 above the measuring axis M, extending pivot axis S is pivotally mounted, (in the embodiment pneumatically by means of a drive cylinder, 39') on a bearing and pivoting device 39.

On the upper side 13 of the holding plate 11, a first radiation source 40 is further provided. In the exemplary embodiment, this first radiation source 40 consists of two groups 40a, 40b of four laser diodes 41. The laser diodes 41 of each group 40a, 40b are arranged in the exemplary embodiment parallel to each other in two rows and at an angle of 15° to the z-axis and the measuring axis M. The laser diodes 41 may be provided with suitable elements for generating line-shaped radiation, e.g. cylindrical lenses, scanning lenses, diffractive optical elements (DOE). The use of computer-generated holograms (CGH) is also possible. The laser diodes 41 are further arranged offset from each other in the embodiment. As a result, the line-shaped beams emitted from the laser diodes 41 are also offset or spaced perpendicular to their propagation direction. In the exemplary embodiment, the distance of the line-shaped beams to each other is about 10 mm. The two groups 40a, 40b of laser diodes 41 are in turn arranged at a right angle to each other. The laser diodes 41 are connected via lines 42 to a power supply device (not shown) in such a way that they can be switched independently of one another and in any combination.

Below the drive unit 16 for the rack gear, a receiving plate 51 for receiving a second radiation source 50 is arranged. As the second radiation source 50, a TFT-based liquid crystal flat panel is provided in the embodiment. The second radiation source 50 is arranged above the gripping device 34 and arranged in a plane oriented perpendicular to the z-axis or to the measuring axis M.

Figure 4:
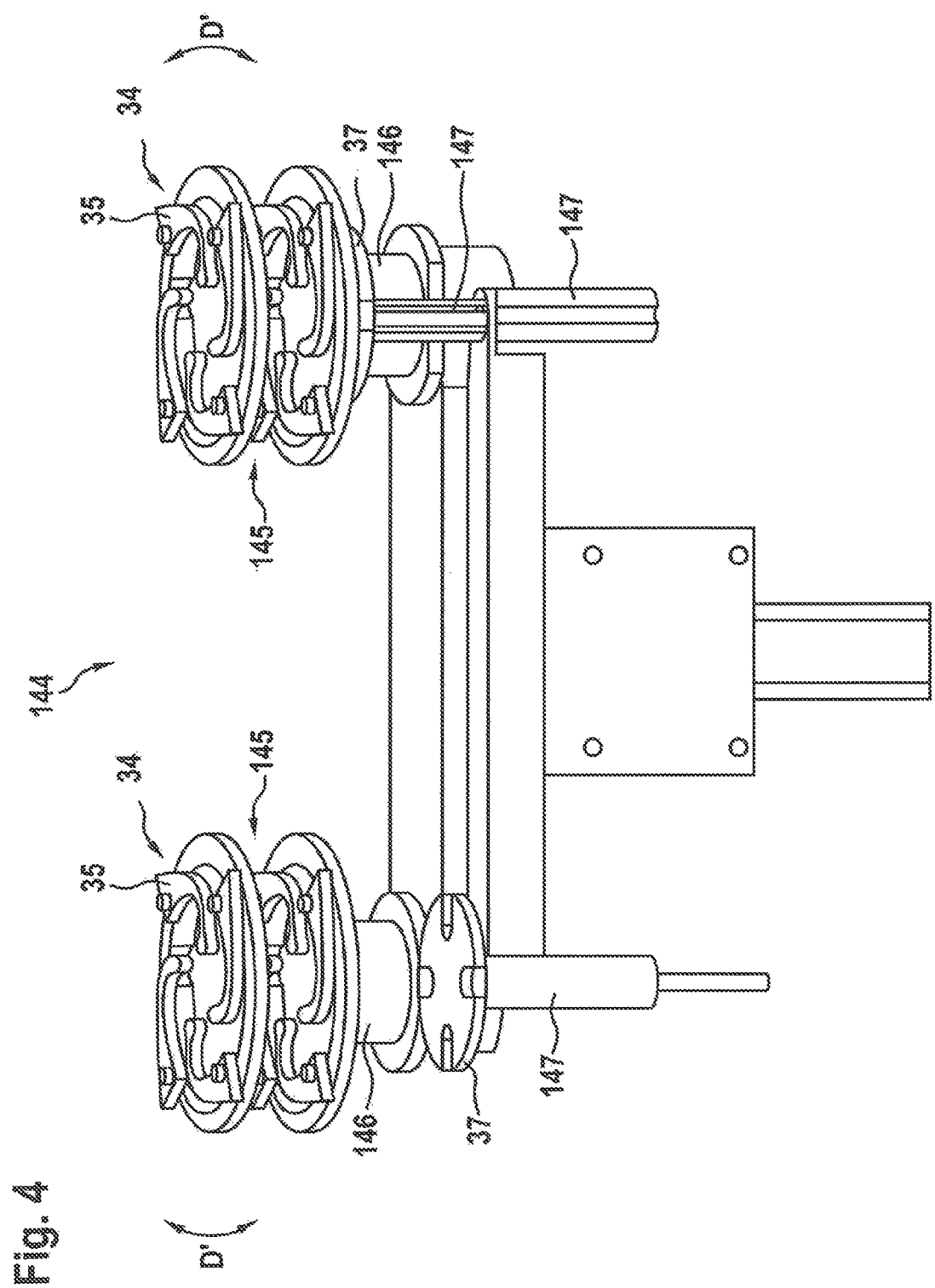
FIG. 4 is a perspective representation of an exemplary gripping and centering sub-assembly of the present invention.

In another embodiment, the measuring device can also consist of two parts each with a camera 22, a first radiation source 40 and a second radiation source 50, as described above. Then, a gripping and centering assembly 144 may be provided, as shown in FIG. 4. The assembly 144 consists of a total of two pairs 145 of two gripping devices 34 with gripping elements 35, as described above. Each pair 145 of gripping devices 34 is associated with a part of the measuring device 10, each with a camera 22, a first radiation source 40 and a second radiation source 50. Each pair 145 of gripping means 34 is rotatably mounted on a rotator 146 in the direction of arrows D by 180°. Each pair 145 of gripping devices 34 is further associated with a respective storage table 37, as described above. Each storage table 37 is adjustable in height by means of an adjusting device 147 and arranged so that it is located in a loading position according to FIG. 2 (right half of FIG. 4) or in a measuring position according to FIG. 3 (left half of FIG. 4) in relation to its associated gripping device 34. The second gripping device 34, which is arranged in each case in the background in FIG. 4, is positioned in relation to the elements camera 22, first radiation source 40 and second radiation source 50 oriented towards it so that the measurement described below can take place. In the position according to the right half of FIG. 4, the front gripping device 34 may be loaded and unloaded with a lens 60 to be measured, as described below, while a lens (not shown) is held and measured in the rear gripping device 34. In the position according to the left half of FIG. 4, a lens 60 to be measured may be held in the front gripping device 34 and a finished lens 60 (not shown) may be held in the rear gripping device 34 so that this pair 145 can be rotated around 180°. Then, the lens 60 to be measured may be measured as described below, while the finished measured lens may be unloaded as described below.

Figure 5:
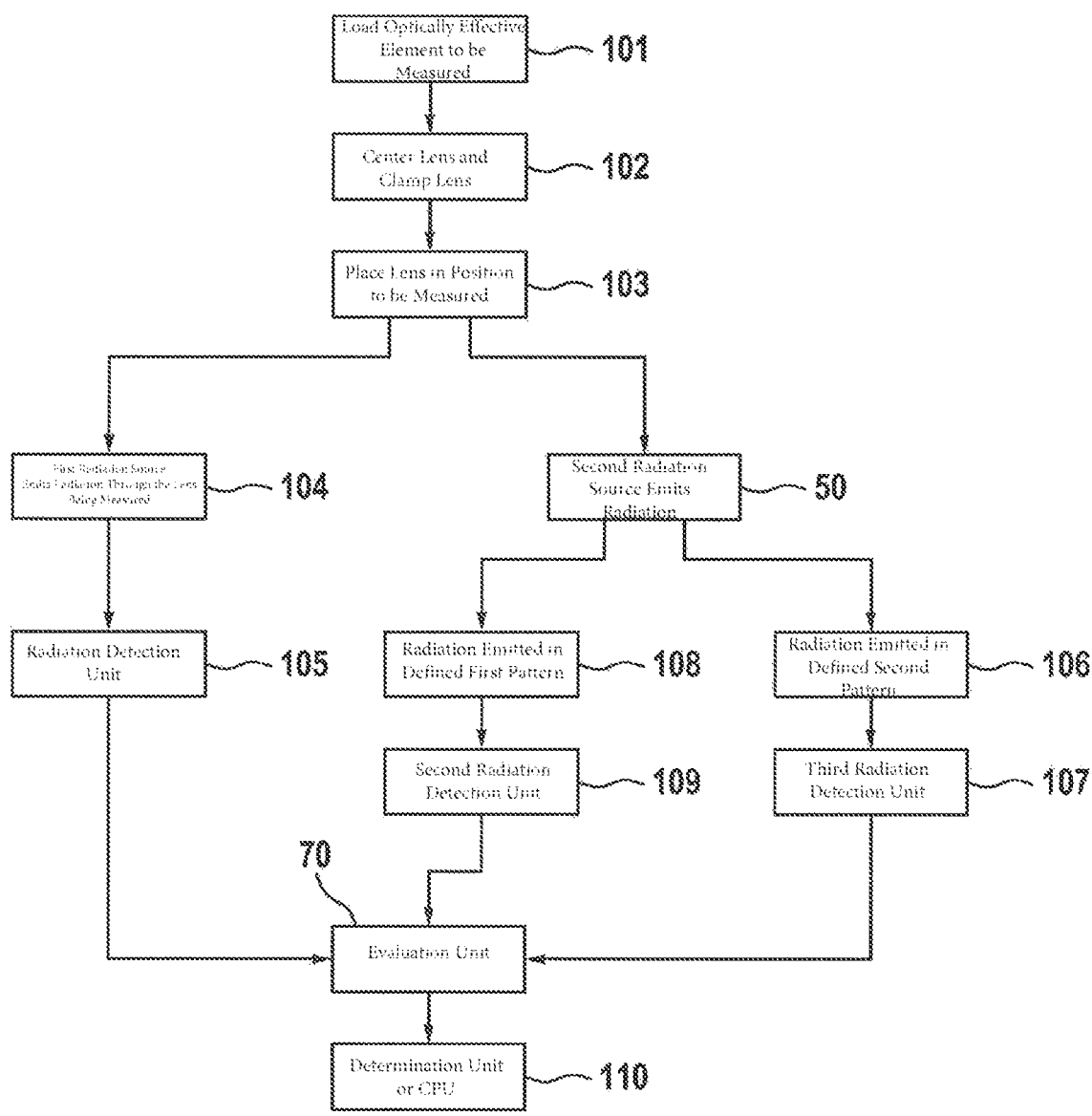
FIG. 5 is a block diagram of an embodiment of the process of the present invention.

FIG. 5 is a flow chart showing the embodiment of the method according to the invention as described below. As shown in FIG. 2, at the beginning of the method, the gripping device 34 of the device 10 according to the invention is in its loading position. In this loading position, the delivery table 37 is arranged directly below the gripping device 34.

The device is first of all loaded in a manner known (see WO 2016/095939 A1) in method step 101 with an optically effective element to be measured, in the exemplary embodiment of a lens optionally provided with a coating, for example for a spectacle lens, such that this lies on the delivery board. The lens is thereby oriented so that its concave underside in the exemplary embodiment is directed toward the camera lens and its convex upper side in the exemplary embodiment is aligned with the second radiation source. Furthermore, in method step 102, the gripping elements are first actuated in such a way that the lens is centered along its circumference within the gripping device with respect to the latter. Subsequently, in method step 102, the gripping elements of the gripping device are actuated such that the lens is clamped by means of the gripping elements, wherein the centering of the lens is substantially maintained. Now, in the process step 103, the delivery table is swung out of the measuring range of the camera's camera lens in order to clear the measuring axis for the camera lens. Finally, in method step 103, the gripping device together with the lens clamped therein is displaced upwardly in the direction of the second radiation source along the z-axis by means of the rack-and-pinion gear.

The gripping device of the device according to the invention is now in a defined measuring position. This measuring position can remain unchanged, regardless of the properties of the optically active element to be measured, in order to contribute to the standardization of the method according to the invention.

Three measuring methods are carried out successively or simultaneously. The first measuring method allows the device to determine the spatial position of the underside of the lens.

In method step 104, each laser diode of the two groups of laser diodes emits a linear beam, in the exemplary embodiment having an excitation radiation wavelength of 405 nm or 450 nm. These defined wavelengths can be filtered out, for example, by means of a filter, not shown, from the radiation emitted by the laser diodes.

Due to the arrangement of the laser diodes, the line-shaped beams emitted by the laser diodes have a spacing of approximately 10 mm perpendicular to their propagation direction relative to each other. As a result, the line-shaped beams emitted by all eight laser diodes in the embodiment meet in the form of a line pattern of two groups of four lines arranged at right angles to the material of the lens and/or its coating. The fluorescence radiation of the material of the lens and/or its coating having a wavelength of more than 405 nm or 450 nm and excited by the line beams thus arranged is therefore emitted in the form of two groups of four spaced-apart lines arranged at right angles to each other (i.e. in the form of a grid or check pattern).

In the exemplary embodiment, two groups arranged at right angles to each other, each consisting of four line-shaped beams, strike the underside of the lens that is concave in the exemplary embodiment. The fluorescence radiation emitted by the material of the lens and/or its coating thus forms a check or grid pattern of two by four fluorescent lines with a wavelength of more than 405 nm or 450 nm in the exemplary embodiment. This fluorescence radiation is detected by the camera lens in method step 105 and detected in the exemplary embodiment by means of a CCD sensor of the camera. If the camera or the camera lens has a filter for absorbing or deflecting the excitation radiation emitted by the laser diodes, the fluorescence radiation can be detected in a particularly reliable and trouble-free manner. The resulting measurement data are fed to an evaluation unit 70.

The measured data are evaluated by means of a known triangulation method (strip projection as a 3D measuring method). Thus, the spatial position of the concave underside of the lens is determined in a conventional manner. For non-symmetrical lenses (e.g. free-form lenses), the measurement result is clear. For symmetrical lenses (e.g. spherical lenses), data on their edge contour (see below) is needed to determine their position in space.

The device according to the invention can be calibrated by carrying out the method described above with a flat glass as the object to be measured. The second measuring method is the determination of characteristics of the lens.

In step 150, a second radiation source (in the exemplary embodiment a TFT-based LCD screen) emits rays in a defined pattern (for example a stripe pattern) in the direction of the convex upper side of the lens in method step 106. The rays pass through the lens, wherein the defined pattern corresponding to the characteristics of the lens, in particular its contour, its edge contour, any markings (e.g. laser engraving) and/or any multi-focal areas (e.g. bifocal or trifocal areas) of the lens is changed. The resulting transmission radiation is detected by the camera lens of the camera in method step 107 and detected in the exemplary embodiment by means of the CCD sensor of the camera in the form of measuring signals. The measurement data resulting from this transmission measurement is supplied to the evaluation unit and evaluated. The device 10 according to the invention can be calibrated by carrying out the method described above with a flat glass as the object to be measured.

The third measuring method of the system allows the device to determine the refractive power of the lens. The second radiation source in the exemplary embodiment a TFT-based LCD screen) emits rays in a defined pattern (for example a stripe pattern) in the direction of the convex upper side of the lens in method step 108. The rays pass through the lens, being deflected depending on the optical properties of the lens. The resulting transmission radiation is detected by the camera lens of the camera in method step 109 and detected in the exemplary embodiment by means of the CCD sensor of the camera in the form of measuring points.

For the evaluation of the measuring points, a ray tracing method known per se is used in the exemplary embodiment (i.e. an algorithm based on the emission of rays for tracing the determined measuring points to their source, the defined pixels). By means of the ray tracing method, the CCD sensor of the measurement points detected by Camera are correlated with the pixels arranged on the second radiation source (i.e. the starting points of the rays detected in the form of measurement points). For the purpose of associating the measuring points detected by the CCD sensor with the pixels defined in the second radiation source, the second radiation source is correspondingly coded in a manner known per se. The measurement data resulting from this transmission measurement and the ray-tracing process are supplied to the evaluation unit and evaluated. In this measuring method, it is advantageous if the defined pattern of the beams emitted by the second radiation source is chosen such that sufficient signal separation, i.e. adequate resolution of the measuring signals, is achieved at the CCD sensor, so that in the optimal case each measuring signal can be evaluated.

The evaluation of the measured data gives the refractive power of the lens. The device according to the invention can be calibrated by carrying out the method described above with a flat glass as the object to be measured.

The combination of these measurement data allows the determination of a planar evaluation of the refractive power of the lens (so-called "power map") in method step 110. Thus, among other things, it is possible to duly distinguish incorporated prisms of prism errors in the lens. This is true of prism errors that have arisen during the shaping of the underside of the lens, as well as prism errors that are detected due to improper positioning of the lens in the device.

The above-described methods for determining the spatial position of the lens (point 1) and for determining its characteristics (point 2) can also be carried out in a deflectometric manner. For this purpose, a radiation emitted by a radiation source is used, for which the lens is impermeable. The radiation source is positioned in such a way that the lens reflects the radiation emitted by the radiation source in the direction of the measurement axis, that is to say in the direction of the camera lens, so that the resulting reflection radiation can be detected by the camera lens and by the CCD sensor of the camera. The evaluation of the resulting measurement data then takes place in a manner known per se.

What is claimed is:

1. A device configured to measure at least one lens, comprising a first radiation source, a second radiation source, a measuring and/or detection device, an evaluation device, and a device for holding the lens between the radiation source and the measuring and/or detection device,
the first radiation source being adapted to emit excitation radiation for excitation of luminescence in the material of the lens and/or in a material coating the lens, and the second radiation source being adapted to emit penetrative radiation through the lens,
wherein the device for holding the lens between the radiation source and the measuring and/or detection device comprises a gripping device.

2. The device according to claim 1, wherein the first radiation source emits excitation radiation for exciting fluorescence radiation in the material of the lens and/or in the material of the coating of the lens.

3. The device according to claim 1, wherein the first radiation source stimulates punctiform, linear and/or grid-shaped luminescence radiation.

4. The device according to claim 1, wherein the second radiation source emits radiation in the form of pixels and/or in the form of patterns.

5. The device according to claim 1, wherein the measuring and/or detection device and at least one of the radiation sources are oriented towards a same upper side or lower side of the lens.

6. The device according to claim 1, wherein the first radiation source is adapted to emit radiation reflectable from the lens.

7. The device according to claim 1, wherein one of the first radiation source and second radiation source is oriented towards an upper side of the lens, and the other one of the first radiation source and second radiation source is oriented towards a lower side of the lens.

8. The device according to claim 1, wherein the first radiation source and second radiation source are oriented together towards an upper side or lower side of the lens.

9. The device according to claim 1, wherein the device for holding the lens between the radiation source and the measuring and/or detection device comprises a table, wherein the table can be swung out of the measuring region of the measuring and/or detection device.

10. A method to measure at least one lens, the method comprising:
providing at least one lens having an upper side and a lower side,
irradiating said lens with a measuring radiation, and measuring radiation resulting therefrom;
wherein excitation radiation is used to excite luminescence radiation in the material of the lens or in the material of a coating of the lens;
wherein the luminescence radiation is measured and/or detected as resulting luminescence radiation; and
wherein the resulting luminescence radiation is used for triangulation and/or for the reflectometric measurement of the surface(s) of the irradiated upper side and/or the irradiated lower side of the lens.

11. The method according to claim 10, wherein excitation radiation is used for exciting fluorescence radiation in the material of the lens and/or in the material of the coating of the lens.

12. The method according to claim 10, further comprising the area evaluation of the refractive power of the lens.

13. The method according to claim 10, wherein a radiation passing through the lens is used in addition to the excitation radiation, and the transmission radiation is measured and/or detected as resulting transmission radiation.

14. The method according to claim 13, wherein the resulting transmission radiation is used for determining the refractive power of the lens.

15. The method according to claim 13, wherein the measurement by the transmission radiation and the measurement by the excitation radiation is performed simultaneously.

16. The method according to claim 10, wherein a radiation which can be reflected by the lens is used in addition to the excitation radiation, and the reflection radiation is measured and/or detected as resulting reflection radiation.

17. The method according to claim 16, wherein the resulting reflection radiation is used for triangulation and/or for the reflectometric measurement of the surface(s) of the irradiated upper side and/or the irradiated lower side of the lens.

18. The method according to claim 16, wherein the resulting reflection radiation is used for determining the refractive power of the lens and/or characteristics of the lens.

19. A method for measuring at least one lens, the method comprising:
   providing at least one lens having an upper side and a lower side,
   irradiating said lens with a measuring radiation and measuring radiation resulting therefrom;
   wherein excitation radiation is used to excite luminescence radiation in the material of the lens or in the material of a coating of the lens;
   wherein the luminescence radiation is measured and/or detected as the resulting luminescence radiation;
   wherein a radiation passing through the optically effective object is used in addition to the excitation radiation, and the transmission radiation is measured and/or detected as resulting transmission radiation, and
   wherein the resulting transmission radiation is used for determining the refractive power of the lens.

20. The method according to claim 19, wherein the measurement by means of the transmission radiation and the measurement by means of the excitation radiation is performed simultaneously.

* * * * *